United States Patent
Chu et al.

(10) Patent No.: US 10,440,598 B2
(45) Date of Patent: Oct. 8, 2019

(54) METHODS AND APPARATUS FOR CLOCK DRIFT MITIGATION WITH SNOOP-BASED RANGING

(71) Applicant: Marvell World Trade Ltd., St. Michael (BB)

(72) Inventors: Liwen Chu, San Ramon, CA (US); Sagar Tamhane, Fremont, CA (US); Hongyuan Zhang, Fremont, CA (US); Hui-Ling Lou, Sunnyvale, CA (US)

(73) Assignee: Marvell World Trade Ltd., St. Michael (BB)

( * ) Notice: Subject to any disclaimer, the term of this patent is extended or adjusted under 35 U.S.C. 154(b) by 0 days.

(21) Appl. No.: 15/469,274

(22) Filed: Mar. 24, 2017

(65) Prior Publication Data

US 2017/0280343 A1 Sep. 28, 2017

Related U.S. Application Data

(60) Provisional application No. 62/312,677, filed on Mar. 24, 2016.

(51) Int. Cl.
*H04W 24/10* (2009.01)
*H04B 17/24* (2015.01)
(Continued)

(52) U.S. Cl.
CPC ............ *H04W 24/10* (2013.01); *H04B 17/24* (2015.01); *H04W 24/08* (2013.01);
(Continued)

(58) Field of Classification Search
None
See application file for complete search history.

(56) References Cited

U.S. PATENT DOCUMENTS 5,740,167 A    4/1998   Taketsugu et al.
6,230,018 B1 *   5/2001   Watters .................... G01S 5/02
                                                                                                                                                    340/988
(Continued)

FOREIGN PATENT DOCUMENTS

WO   WO-2011/124948 A1   10/2011
WO   WO-2015/058014 A1   4/2015

OTHER PUBLICATIONS

IEEE P1588™ D2.2 "Draft Standard for a Precision Clock Synchronization Protocol for Networked Measurement and Control Systems," *The Institute of Electrical and Electronics Engineers, Inc.*, 2008.

(Continued)

*Primary Examiner* — Candal Elpenord

(57) ABSTRACT

A first communication device generates a range measurement packet (or a packet that includes a probe response frame, a TIM frame, etc.) associated with a range measurement signal exchange session between the first communication device and a second communication device. The first communication device records a time value of a first timer corresponding to a time of transmission of the packet, and includes timing information corresponding to the recorded time value in the packet. The first communication device transmits the packet to the second communication device. The timing information in the packet is useable by a third communication device to adjust time values corresponding to a second timer, which the third communication device includes.

26 Claims, 10 Drawing Sheets

(51) Int. Cl.
*H04W 24/08* (2009.01)
*H04W 56/00* (2009.01)
*G01S 5/00* (2006.01)
*H04W 64/00* (2009.01)

(52) U.S. Cl.
CPC ... *H04W 56/0015* (2013.01); *H04W 56/0055* (2013.01); *H04W 56/0065* (2013.01); *G01S 5/00* (2013.01); *H04W 64/00* (2013.01)

(56) References Cited

U.S. PATENT DOCUMENTS

| | | | |
|---|---|---|---|
| 7,512,089 B2 | 3/2009 | Wybenga et al. | |
| 7,515,945 B2 | 4/2009 | Ruuska et al. | |
| 7,535,884 B2 | 5/2009 | Stephenson et al. | |
| 7,599,346 B2 | 10/2009 | Brommer | |
| 7,814,322 B2 | 10/2010 | Gurevich et al. | |
| 8,139,553 B2 | 3/2012 | Chang et al. | |
| 8,570,898 B1 | 10/2013 | Kopikare et al. | |
| 8,886,833 B1 | 11/2014 | Kopikare et al. | |
| 8,953,644 B2* | 2/2015 | Chandra | H04J 3/0667 370/503 |
| 9,456,306 B2 | 9/2016 | Wang et al. | |
| 2002/0147819 A1 | 10/2002 | Miyakoshi et al. | |
| 2005/0053015 A1 | 3/2005 | Jin et al. | |
| 2005/0135286 A1 | 6/2005 | Nurminen et al. | |
| 2006/0126622 A1 | 6/2006 | Park et al. | |
| 2007/0171922 A1 | 7/2007 | Jabri et al. | |
| 2007/0237210 A1 | 10/2007 | Voglewede et al. | |
| 2007/0297352 A1 | 12/2007 | Jabri et al. | |
| 2008/0092204 A1 | 4/2008 | Bryce et al. | |
| 2009/0103501 A1 | 4/2009 | Farrag et al. | |
| 2009/0109946 A1 | 4/2009 | Morton et al. | |
| 2009/0310619 A1 | 12/2009 | Brommer | |
| 2010/0020746 A1 | 1/2010 | Zaks | |
| 2010/0085885 A1* | 4/2010 | Sakurada | H04J 3/0667 370/252 |
| 2010/0202436 A1* | 8/2010 | Albert | H04J 3/0655 370/350 |
| 2011/0010246 A1 | 1/2011 | Kasslin et al. | |
| 2012/0207146 A1* | 8/2012 | Jin | H04W 56/0075 370/350 |
| 2012/0252503 A1 | 10/2012 | Wu | |
| 2014/0187259 A1 | 7/2014 | Kakani et al. | |
| 2014/0295877 A1* | 10/2014 | Hart | H04W 4/02 455/456.1 |
| 2014/0335885 A1 | 11/2014 | Steiner et al. | |
| 2015/0049716 A1 | 2/2015 | Gutierrez et al. | |
| 2015/0063228 A1 | 3/2015 | Aldana | |
| 2015/0139212 A1* | 5/2015 | Wang | G01S 5/06 370/338 |
| 2015/0341881 A1* | 11/2015 | Hiltunen | H04W 64/00 370/350 |
| 2015/0365913 A1 | 12/2015 | Aldana | |
| 2016/0150499 A1* | 5/2016 | Aldana | H04L 5/0055 455/456.2 |
| 2018/0176874 A1* | 6/2018 | Wang | H04W 56/0015 |

OTHER PUBLICATIONS

IEEE P802.11ax™/D0.1, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for high efficiency in frequency bands between 1 GHz and 6 GHz," IEEE Computer Society, 221 pages (Mar. 2016).
IEEE Std 802.11-REVmc™/D8.0, Aug. 2016, "Draft Standard for Information technology—Telecommunications and information exchange between systems—Local and metropolitan area networks—Specific requirements" Part 11: Wireless LAN Medium Access Control (MAC) and Physical Layer (PHY) Specifications, *The Institute of Electrical and Electronics Engineers, Inc.*, pp. i-civ, 291-294, 336-341, 387-389, 771-773, 819-821, 858-865, 901-903, 1062-1066, 1158-1161, 1552-1571, 1703-1707, 1740, 1741, 1765-1775, 2193, 2194, 3601, 3602 (Aug. 2016).
IEEE Std 802.11-REVmc™/D5.0, Jan. 2016, "Draft Standard for Information technology—Telecommunications and information exchange between systems—Local and metropolitan area networks—Specific requirements, Part 11: Wireless LAN Medium Access Control (MAC) and Physical Layer (PHY) Specifications," *The Institute of Electrical and Electronics Engineers, Inc.*, pp. i-ciii, 293-297, 339-343, 389-391, 777, 778, 825-827, 864-870, 907-909, 1063-1067, 1157-1160, 1554-1572, 1702-1707, 1739, 1740, 1764-1773, 2188, 2189, 3597, 3598 (Jan. 2016).
IEEE Std 802.11ac/D7.0 "Draft STANDARD for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-456 (Sep. 2013).
IEEE Std 802.11™ 2012 (Revision of IEEE Std 802.11-2007) IEEE Standard for Information technology—Telecommunications and information exchange between systems—Local and metropolitan area networks—Specific requirements Part 11: Wireless LAN Medium Access Control (MAC) and Physical Layer (PHY) specifications, The Institute of Electrical and Electronics Engineers, Inc., pp. 1-2695 (Mar. 29, 2012).
IEEE Std. 1588™—2008 (Revision of IEEE Std. 1588-2002), "IEEE Standard for a Precision Clock Synchronization Protocol for Networked Measurement and Control Systems," *The Institute for Electrical and Electronics Engineers, Inc.*, IEEE Standard, pp. 1-289 (Jul. 24, 2008).
IEEE Std. 802.11n™ "IEEE Standard for Information Technology—Telecommunications and information exchange between systems—Local and metropolitan area networks—Specific requirements, Part 11: Wireless LAN Medium Access Control (MAC) and Physical Layer (PHY) Specifications: Amendment 5: Enhancements for Higher Throughput," *The Institute of Electrical and Electronics Engineers, Inc.*, pp. 1-535 (Oct. 2009).
IEEE Std. C37.238™—2011, "IEEE Standard Profile for Use of IEEE 1588™ Precision Time Protocol in Power System Applications," *Institute for Electrical and Electronics Engineers, Inc.*, pp. 1-66 (Jul. 2011).
ITU-T Recommendation G.8265.1/Y.1365.1, "Precision time protocol telecom profile for frequency synchronization," *Int'l Telecommunication Union*, pp. 1-28 (Oct. 2010).
Aldana et al., IEEE P802.11—Wireless LANs, "CIDs 46,47,48 Regarding Fine Timing Measurement," *The Institute of Electrical and Electronics Engineers, Inc.*, doc.: IEEE 802.11 11-12-1249-04-000m, pp. 1-17 (Jan. 2013).
Gurewitz et al., "Estimating One-Way Delays from Cyclic-Path Delay Measurements," Proc. of Twentieth Annual Joint Conf. of the IEEE Computer and Comm. Societies (IEEE INFOCOM 2001), vol. 2, pp. 1038-1044 (2001).
Gurewitz et al., "One-Way Delay Estimation Using Network Wide Measurements," IEEE Trans. on Information Theory, vol. 52, No. 6, pp. 2710-2724 (2006).
Lee, "An Enhanced IEEE 1588 Time Synchronization Algorithm for Asymmetric Communication Link Using Block Burst Transmission", IEEE Communications Letters, vol. 12, No. 9, pp. 687-689 (Sep. 2008).
Lv et al., "An Enhanced IEEE 1588 Time Synchronization for Asymmetric Communication Link in Packet Transport Network," IEEE Communications Letters, vol. 14. No. 8. pp. 764-766 (Aug. 2010).
Mills et al., "Network Time Protocol Version 4: Protocol and Algorithms Specification," Request for Comments: 5905, *Internet Engineering Task Force (IETF)*, pp. 1-111 (Jun. 2010).
Mills, "Internet Time Synchronization: The Network Time Protocol," Network Working Group Request for Comments, No. 1129, pp. 1-29 (Oct. 1989).

(56) References Cited

OTHER PUBLICATIONS

Peer-to-Peer Technical Specification, Revision 1.0, Wi-Fi Alliance Peer-to-Peer Technical Task Group, May 12, 2009; 43 pages.
U.S. Appl. No. 14/687,705, Chu et al., "Peer to Peer Ranging Exchange," filed Apr. 15, 2015.
U.S. Appl. No. 15/041,911, Chu et al., "Methods and Apparatus for Range Measurement," filed Feb. 11, 2016.
U.S. Appl. No. 15/041,954, Chu et al., "Methods and Apparatus for Range Measurement," filed Feb. 11, 2016.
Vegt, "Location MRD Submission on Wi-Fi Direct Based STA-STA FTM ranging," Wireless Network Management, Apr. 4, 2014—9 pages.
Wi-Fi Peer-to-Peer (P2P) Technical Specification, Revision 1.2, Wi-Fi Alliance Technical Committee P2P Task Group, (2010) 159 pages.
Zarick et al., "The Impact of Network Latency on the Synchronization of Real-World IEEE 1588-2008 Devices," Proc. of the 2010 Int'l IEEE Symposium on Precision Clock Synchronization for Measurement, Control and Communication, pp. 135-140 (Sep. 27-Oct. 1, 2010).
Zhu et al., "IEEE P802.11, Wireless LANs, Proposed 802.11az Functional Requirements," *Institute of Electrical and Electronics Engineers*, doc. IEEE 802.11-16/0424r4, 6 pages (Mar. 13, 2017).
International Search Report and Written Opinion in International Patent Application No. PCT/US2017/024085, dated Jun. 19, 2017 (13 pages).
International Preliminary Report on Patentability in International Patent Application No. PCT/US2017/024085, dated Oct. 4, 2018 (10 pages).

\* cited by examiner

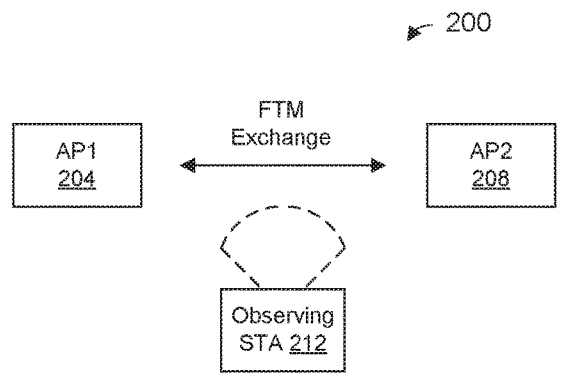
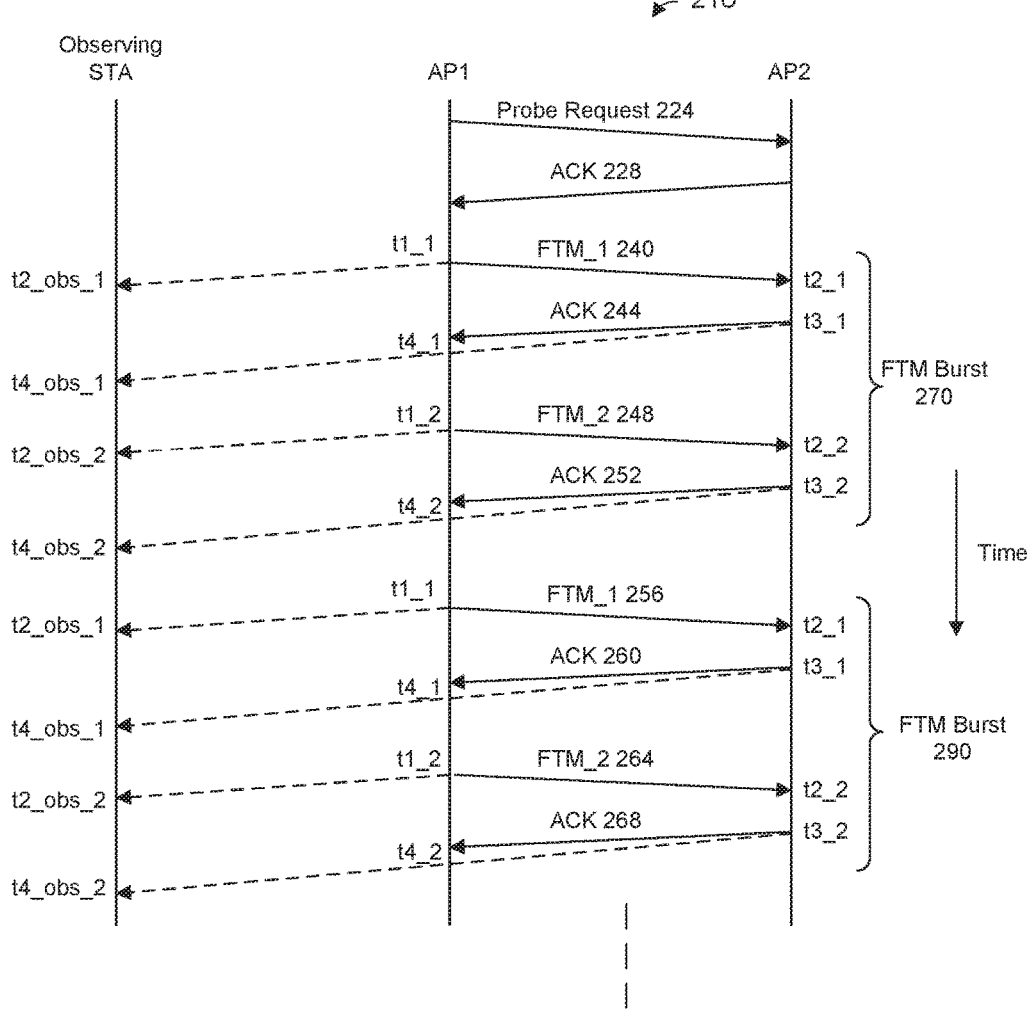

METHODS AND APPARATUS FOR CLOCK DRIFT MITIGATION WITH SNOOP-BASED RANGING

CROSS REFERENCES TO RELATED APPLICATIONS

This application claims the benefit of U.S. Provisional Patent App. No. 62/312,677, entitled "Clock Drift Mitigation with Snoop-Based Ranging," filed on Mar. 24, 2016, the disclosure of which is hereby expressly incorporated herein by reference in its entirety.

FIELD OF TECHNOLOGY

The present disclosure relates generally to wireless communication systems, and more particularly to mitigating clock drift in wireless communication devices.

BACKGROUND

In some wireless communication systems, it may be useful to determine positions of wireless communication devices. Some techniques for determining positions of wireless communication devices involve determining distances between communication devices, and using distance measurements to calculate positions of the devices. A distance between two devices can be determined by transmitting a signal from one device to another, determining the time it took for the signal to travel between the two devices (time of flight), and then calculating the distance between the two devices based on the time of flight.

In some wireless communication systems, communications are scheduled using timing information, such as TSF (time synchronization function) time or a time of day. For example, in many communication systems, communication devices maintain respective local clocks, and each communication device uses its local clock for purposes of determining when the communication device should transmit, when to expect another communication device to transmit, etc.

In some wireless communication systems, each communication device uses its local clock for purposes of determining times of flight. For example, a first communication device may use its local clock for recording when the first communication device transmitted a first packet to a second communication device, when the first communication device received a second packet transmitted by the second communication device, etc., and then may use the recorded times to estimate a time of flight between the first communication device and the second communication device.

In some wireless communication systems, communication devices may negotiate a time period for performing distance measurements. During the negotiated time period, the communication devices should be prepared to transmit or receive signals for distance measurement, e.g., be tuned to a same channel during the negotiated time period. However, over time, local clocks of different communication devices will drift with respect to each other, which may cause degradation in performance and, in some situations, result in the communication devices missing distance measurement transmissions because of different determinations of when the negotiated time period begins and ends.

SUMMARY

In an embodiment, a method includes: generating, at a first communication device, a range measurement packet (or a packet that includes a probe response frame, a TIM frame, etc.) associated with a range measurement signal exchange session between the first communication device and a second communication device; recording, at the first communication device, a time value of a first timer corresponding to a time of transmission of the packet; including, at the first communication device, timing information corresponding to the recorded time value in the packet; and transmitting, from the first communication device, the packet to the second communication device, wherein the timing information in the packet is useable by a third communication device to adjust time values corresponding to a second timer, wherein the third communication device includes the second timer.

In another embodiment, an apparatus comprises a network interface device associated with a first communication device. The network interface device includes one or more integrated circuits (ICs) configured to: generate a range measurement packet (or a packet that includes a probe response frame, a TIM frame, etc.) associated with a range measurement signal exchange session between the first communication device and a second communication device; record a time value of a first timer corresponding to a time of transmission of the packet; include, in the packet, timing information corresponding to the recorded time value; and transmit the packet to the second communication device, wherein the timing information in the packet is useable by a third communication device to adjust time values corresponding to a second timer, wherein the third communication device includes the second timer.

In yet another embodiment, a method is implemented at a first communication device that includes a first timer and a second timer. The first timer is used by the first communication device to estimate a start time of a range measurement signal exchange session between the first communication device and a second communication device, and the second timer is used by the first communication device to determine at least times of departure of range measurement packets associated with the range measurement signal exchange session at the first communication device. The method includes: generating, at the first communication device, a first range measurement packet (or a packet that includes a probe response frame, a TIM frame, etc.) associated with the range measurement signal exchange session between the first communication device and the second communication device; recording, at the first communication device, a time value of the first timer corresponding to a time of transmission of the first packet; transmitting, from the first communication device, the first packet; generating, at the first communication device, a second range measurement packet (or a packet that includes a probe response frame, a TIM frame, etc.) associated with the range measurement signal exchange session between the first communication device and the second communication device; include, at the first communication device, timing information corresponding to the recorded time value of the first timer in the second packet; and transmitting, from the first communication device, the second packet associated with the range measurement signal exchange session, wherein the timing information in the second packet is useable by a third communication device to adjust a third timer, wherein the third communication device includes the third timer, and wherein the third timer is used by the third communication device to estimate a start time of a next range measurement signal exchange session between the first communication device and the second communication device.

In still another embodiment, an apparatus comprises a network interface device associated with a first communication device. The network interface device includes: one or more integrated circuits (ICs), a first timer implemented on the one or more ICs, and a second timer implemented on the one or more ICs. The first timer is used by the network interface device to estimate a start time of a range measurement signal exchange session between the first communication device and a second communication device, and the second timer is used by the network interface device to determine at least times of departure of range measurement packets associated with the range measurement signal exchange session at the first communication device. The one or more ICs are configured to: generate a first range measurement packet (or a packet that includes a probe response frame, a TIM frame, etc.) for the range measurement signal exchange session between the first communication device and the second communication device; record a time value of the first timer corresponding to a time of transmission of the first packet; transmit the first packet; generate a second range measurement packet (or a packet that includes a probe response frame, a TIM frame, etc.) associated with the range measurement signal exchange session between the first communication device and the second communication device; include timing information corresponding to the recorded time value of the first timer in the second packet; and transmit the second packet associated with the range measurement signal exchange session, wherein the timing information in the second packet is useable by a third communication device to adjust a third timer, wherein the third communication device includes the third timer, and wherein the third timer is used by the third communication device to estimate a start time of a next range measurement signal exchange session between the first communication device and the second communication device.

BRIEF DESCRIPTION OF THE DRAWINGS

FIG. 2A is a block diagram of an example system in which an observing station observes range measurement signals exchanged between two access points, according to an embodiment.

FIG. 2B is a signal timing diagram illustrating an example exchange of range measurement signals between the two access points of FIG. 2A, according to an embodiment.

DETAILED DESCRIPTION

Clock drift mitigation techniques described below are discussed in the context of wireless local area networks (WLANs) that utilize protocols the same as or similar to protocols defined by the 802.11 Standard from the Institute of Electrical and Electronics Engineers (IEEE) merely for explanatory purposes. In other embodiments, however, clock drift mitigation techniques are utilized in other types of wireless communication systems such as personal area networks (PANs), mobile communication networks such as cellular networks, metropolitan area networks (MANs), satellite communication networks, etc.

Figure 1:
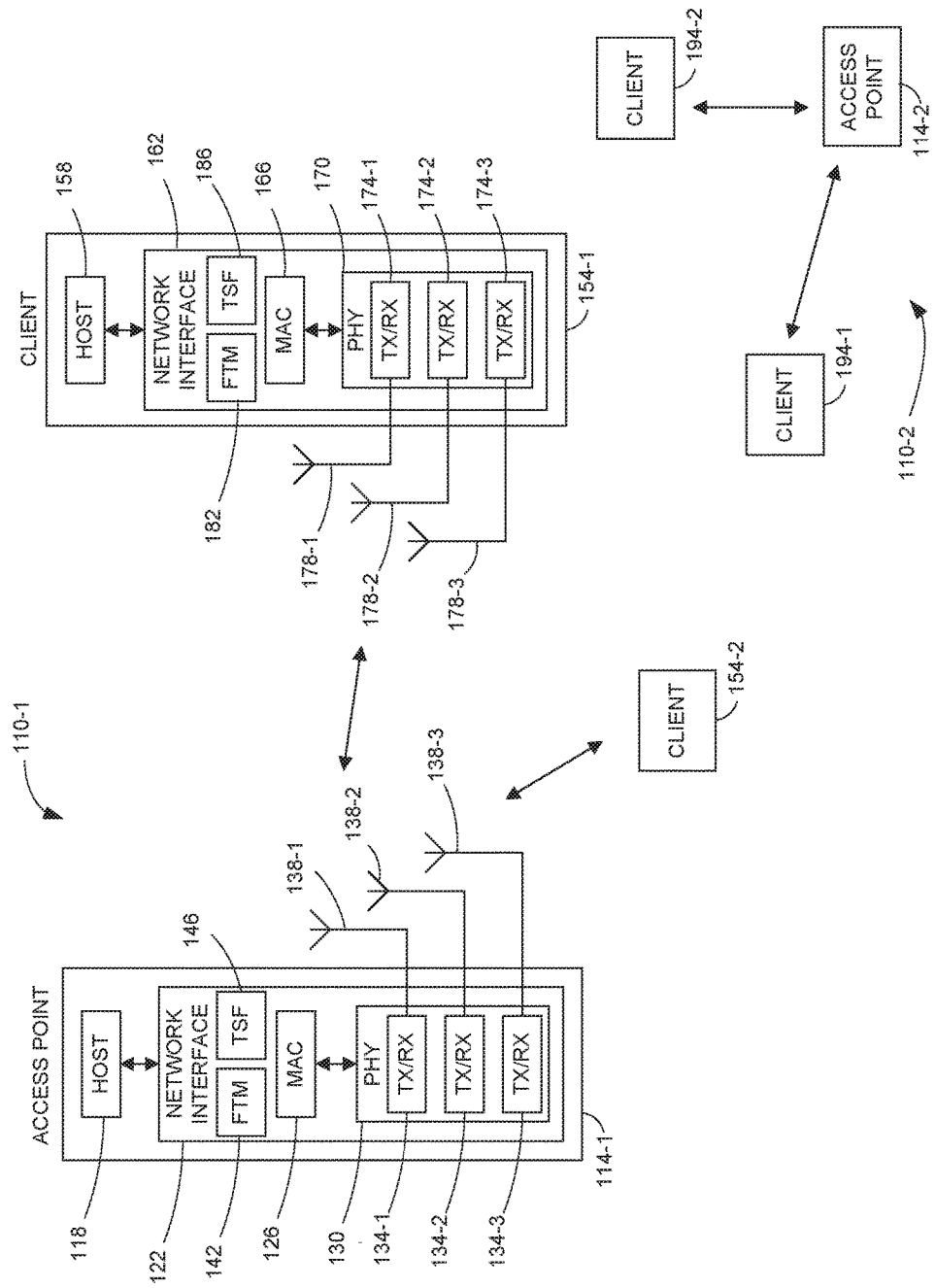
FIG. 1 is a block diagram of an example system having multiple wireless local area networks (WLANs), according to an embodiment.

FIG. 1 is a block diagram of an example communication system including multiple WLANs 110, according to an embodiment. For example, a first WLAN 110-1 includes an access point (AP) 114-1 that comprises a host processor 118 coupled to a network interface device 122. The network interface 122 includes one or more integrate circuits (ICs) configured to operate as discussed below. The network interface 122 includes a medium access control (MAC) processor 126 and a physical layer (PHY) processor 130. The PHY processor 130 includes a plurality of transceivers 134, and the transceivers 134 are coupled to a plurality of antennas 138. Although three transceivers 134 and three antennas 138 are illustrated in FIG. 1, the AP 114-1 includes other suitable numbers (e.g., 1, 2, 4, 5, etc.) of transceivers 134 and antennas 138 in other embodiments. In some embodiments, the AP 114-1 includes a higher number of antennas 138 than transceivers 134, and antenna switching techniques are utilized.

In various embodiments, the network interface 122 is implemented on one or more ICs. For example, the MAC processor 126 may be implemented on at least a first IC, and the PHY processor 130 may be implemented on at least a second IC. As another example, at least a portion of the MAC processor 126 and at least a portion of the PHY processor 130 may be implemented on a single IC. For instance, the network interface 122 may be implemented using a system on a chip (SoC), where the SoC includes at least a portion of the MAC processor 126 and at least a portion of the PHY processor 130.

In various embodiments, the MAC processor 126 and/or the PHY processor 130 of the AP 114-1 are configured to generate data units, and process received data units, that conform to a WLAN communication protocol such as a communication protocol conforming to the IEEE 802.11 Standard or another suitable wireless communication protocol. For example, the MAC processor 126 may be configured to implement MAC layer functions, including MAC layer functions of the WLAN communication protocol, and the PHY processor 130 may be configured to implement PHY functions, including PHY functions of the WLAN communication protocol. For instance, the MAC processor 126 may be configured to generate MAC layer data units such as MAC protocol data units (MPDUs), MAC control frames, etc., and provide the MAC layer data units to the PHY processor 130. The PHY processor 130 may be configured to receive MAC layer data units from the MAC processor 126 and encapsulate the MAC layer data units to generate PHY data units such as PHY protocol data units (PPDUs) for transmission via the antennas 138. Similarly, the PHY processor 130 may be configured to receive PHY data units that were received via the antennas 138, and extract MAC layer data units encapsulated within the PHY data units. The PHY processor 130 may provide the extracted MAC layer data units to the MAC processor 126, which processes the MAC layer data units.

In an embodiment, the network interface 122 of the AP 114-1 includes a fine timing measurement (FTM) controller 142 configured to perform an FTM procedure for measuring a time of flight (ToF) of a radio frequency (RF) signal between two network devices. The ToF may be used to measure a range (i.e., distance) between the network devices. In some embodiments, range measurements are further used to calculate estimates of positions of network devices. Examples of FTM procedures implemented by the FTM controller 142, according to some embodiments, are described below. For instance, the FTM controller 142 may cause or prompt the network interface 122 to transmit communication frames for purposes of measuring a time of flight between the AP 114-1 and another communication device.

In some embodiments, the FTM controller 142 performs functions corresponding to a layer in a communication protocol stack above the MAC layer. For example, the FTM controller 142 may interface, directly or indirectly (e.g., via one or more layers in the communication protocol stack between the FTM functions and the MAC layer), with the MAC processor 126 to cause or prompt the network interface 122 to transmit communication frames for purposes of measuring a time of flight between the AP 114-1 and another communication device. Similarly, the MAC processor 126 may forward, directly or indirectly, data units to the FTM controller 142 that were received by the AP 114-1 as part of a frame exchange with another communication device for measuring a time of flight.

In some embodiments, the FTM controller 142 performs functions corresponding to a sublayer within the MAC layer.

In an embodiment, the FTM controller 142 comprises a processor configured to execute machine readable instructions stored in a memory of, or coupled to, the FTM controller 142. In an embodiment, the FTM controller 142 comprises hardwired state machine circuitry. In an embodiment, the FTM controller 142 comprises hardwired state machine circuitry and a processor configured to execute machine readable instructions stored in a memory of, or coupled to, the FTM controller 142.

In some embodiments, the network interface 122 of the AP 114-1 includes a timer (e.g., a clock) 146 that the network interface 122 uses to maintain a reference time corresponding to the network 110-1. The timer 146 maintains a local version of a timing synchronization function (TSF) timer defined by the IEEE 802.11 Standard. TSF is used to maintain synchronization of all devices in a same basic service set (BSS). In an embodiment, the TSF timer is utilized to define timing of signals associated with an FTM procedure. For example, the TSF timer is used to define a start of a burst of packet exchanges associated with an FTM procedure. In an embodiment, the network interface 122 uses the TSF timer to determine when an FTM burst is to be initiated. Each device in the BSS maintains its own TSF time (e.g., using a local timer such as the timer 146). Furthermore, each device in the BSS uses its respective TSF timer to estimate a start of an FTM burst. Devices in the BSS exchange information (e.g., in beacon frames, etc.) that includes the TSF times of respective devices, and devices may set their respective TSF times to a same value as other devices to maintain timing synchronization.

In some embodiments, the timer 146 includes, in addition to the TSF timer, a time of arrival/time of departure (ToA/ToD) timer for determining when FTM transmissions are transmitted and received. The ToA/ToD timer is sometimes referred to herein as an FTM timer. In an embodiment, determining when FTM transmissions are transmitted and received corresponds to determining a time at which a start of a preamble of an FTM packet corresponding to an FTM transmission appears at a transmit antenna connector or a receive antenna connector. Each device in the BSS maintains its own FTM timer, in an embodiment.

Each TSF timer and FTM timer keeps track of time by counting a number of time base intervals in a given duration of time. In other words, a time base interval (also referred as time base) of a timer is a minimum unit of time that is tracked by the timer. In an embodiment, a same time base is used for the TSF timer and the FTM timer. In other embodiments, different time bases are used for the TSF timer and the FTM timer.

The WLAN 110-1 includes a plurality of client stations 154. Although two client stations 154 are illustrated in FIG. 1, the WLAN 110-1 includes other suitable numbers (e.g., 1, 3, 4, 5, 6, etc.) of client stations 154 in various scenarios and embodiments. The client station 154-1 includes a host processor 158 coupled to a network interface device 162. In an embodiment, the network interface 162 includes one or more ICs configured to operate as discussed below. The network interface 162 includes a MAC processor 166 and a PHY processor 170. The PHY processor 170 includes a plurality of transceivers 174, and the transceivers 174 are coupled to a plurality of antennas 178. Although three transceivers 174 and three antennas 178 are illustrated in FIG. 1, the client station 154-1 includes other suitable numbers (e.g., 1, 2, 4, 5, etc.) of transceivers 174 and antennas 178 in other embodiments. In some embodiments, the client station 154-1 includes a higher number of antennas 178 than transceivers 174, and antenna switching techniques are utilized.

In various embodiments, the network interface 162 is implemented on one or more ICs. For example, the MAC processor 166 may be implemented on at least a first IC, and the PHY processor 170 may be implemented on at least a second IC. As another example, at least a portion of the MAC processor 166 and at least a portion of the PHY processor 170 may be implemented on a single IC. For instance, the network interface 122 may be implemented using an SoC, where the SoC includes at least a portion of the MAC processor 166 and at least a portion of the PHY processor 170.

In various embodiments, the MAC processor 166 and the PHY processor 170 of the client device 154-1 are configured to generate data units, and process received data units, that conform to the WLAN communication protocol or another suitable communication protocol. For example, the MAC processor 166 may be configured to implement MAC layer functions, including MAC layer functions of the WLAN communication protocol, and the PHY processor 170 may be configured to implement PHY functions, including PHY functions of the WLAN communication protocol. The MAC processor 166 may be configured to generate MAC layer data units such as MPDUs, MAC control frames, etc., and provide the MAC layer data units to the PHY processor 170. The PHY processor 170 may be configured to receive MAC layer data units from the MAC processor 166 and encapsulate the MAC layer data units to generate PHY data units such as PPDUs for transmission via the antennas 178. Similarly, the PHY processor 170 may be configured to receive PHY data units that were received via the antennas 178, and extract MAC layer data units encapsulated within the PHY data units. The PHY processor 170 may provide the extracted MAC layer data units to the MAC processor 166, which processes the MAC layer data units.

In an embodiment, the network interface 162 of the client station 154-1 includes an FTM controller 182 configured to perform an FTM procedure for measuring a ToF of an RF signal between two network devices. In an embodiment, the FTM controller 182 comprises a processor configured to execute machine readable instructions stored in a memory of, or coupled to, the FTM controller 182. In an embodiment, the FTM controller 182 comprises hardwired state machine circuitry. In an embodiment, the FTM controller 182 comprises hardwired state machine circuitry and a processor configured to execute machine readable instructions stored in a memory of, or coupled to, the FTM controller 182.

In some embodiments, the network interface 162 of the client station 154-1 includes a timer (e.g., a clock) 186 that the network interface 122 uses to maintain a reference time corresponding to the network 110-1. In some embodiments, the timer 186 maintains a local version of a TSF timer defined by the IEEE 802.11 Standard. In an embodiment, the client station 154-1 uses the local version of the TSF timer to determine when an FTM burst is expected to start.

In some embodiments, the timer 186 includes, in addition to the TSF timer, a ToA/ToD timer (also referred to herein as an FTM timer) for determining when FTM transmissions are transmitted and received. In an embodiment, a same time base is used for the TSF timer and the FTM timer. In other embodiments, different time bases are used for the TSF timer and the FTM timer.

In an embodiment, the client station 154-2 has a structure that is the same as or similar to the client station 154-1. The client station 154-2 structured the same as or similar to the client station 154-1 has the same or a different number of transceivers and antennas. For example, the client station 154-2 has only two transceivers and two antennas (not shown), according to an embodiment.

The system illustrated in FIG. 1 also includes a WLAN 110-2. The WLAN 110-2 includes an AP 114-2 and a plurality of client stations 194. In an embodiment, the AP 114-2 has a structure that is the same as or similar to the AP 114-1. The AP 114-2 structured the same as or similar to the AP 114-1 has the same or a different number of transceivers and antennas. For example, the AP-2 has only two transceivers and two antennas (not shown), according to an embodiment.

In an embodiment, the client stations 194 each have a respective structure that is the same as or similar to the client station 154-1. Each client station 194 structured the same as or similar to the client station 154-1 has the same or a different number of transceivers and antennas. For example, the client station 194-1 has only two transceivers and two antennas (not shown), according to an embodiment.

Although two client stations 194 are illustrated in FIG. 1, the WLAN 110-2 includes other suitable numbers (e.g., 1, 3, 4, 5, 6, etc.) of client stations 194 in various scenarios and embodiments.

In some embodiments, the AP 114-1 (AP1) exchanges range measurement signals with the AP 114-2 (AP2) to determine a distance between communication devices in the system of FIG. 1. The determined distances between communication devices may be used to determine positions of communication devices in the system of FIG. 1, for example. In some embodiments, a client station 154, 194 ("observing station") receives the range measurement signals exchanged between AP1 and AP2, and the time of arrival of the range measurement signals at the observing station is utilized to determine a distance(s) between the observing station and AP1 and/or AP2, and/or utilized to determine a location of the observing station using a known location(s) of AP1 and/or AP2.

FIG. 2A is a diagram of an example system 200 in which a first AP 204 (AP1) exchanges range measurement signals with a second AP 208 (AP2), according to an embodiment. The system 200 includes a client station 212 ("observing station 212") that also receives the range measurement signals exchanged between AP1 and AP2. Range measurement signals are sometimes referred to herein as "fine timing measurement signals" or "FTM signals"). In an embodiment, AP1 is the AP 114-1 of FIG. 1, AP2 is the AP 114-2 of FIG. 1, and the client station 212 is the client station 154-1 of FIG. 1. In other embodiments, AP1, AP2, and client station 212 are wireless communication devices having different suitable structures than the AP 114-1, the AP 114-2, and the client station 154-1 of FIG. 1. Although only one observing station 212 is illustrated in FIG. 2A, there are multiple observing stations in other embodiments and/or scenarios. While the terminology used herein is consistent with an FTM protocol as employed in the IEEE 802.11 Standard, the embodiments discussed herein are generally applicable to any other suitable distance measurement protocol or timing synchronization protocol.

In some embodiments, the system 200 performs an FTM procedure in which AP1 and AP2 exchange FTM signals while the client station 212 observes the exchange of signals. For instance, FIG. 2B is a signal timing diagram illustrating an example FTM procedure 216 between AP1 and AP2, in which the client station 212 observes FTM signal exchanges between AP1 and AP2.

AP1 generates and transmits a probe request packet 224. In response to the probe request packet 224, AP2 generates and transmits an acknowledgment (ACK) packet 228. In an embodiment, AP2 is configured to transmit the ACK packet 228 a predetermined amount of time T_ack after receiving an end of the probe request packet 224. For example, a communication protocol defines the predetermined amount of time, in an embodiment. In an embodiment, the predetermined amount of time T_ack is a short interface space (SIFS) as defined by the IEEE 802.11 Standard. In other embodiments, the predetermined amount of time T_ack is another suitable value.

In some embodiments, transmission of the probe request packet 224 and the ACK packet 228 are omitted. For example, in some embodiments, AP1 transmits information included in the probe request packet 224 in beacons.

AP1 generates an FTM packet 240 (FTM_1). At a time t1_1, AP1 transmits the FTM packet 240, and AP1 records the time t1_1. In an embodiment, the time t1_1 corresponds to an event at which a beginning of the FTM packet 240 is transmitted. In an embodiment, AP1 generates the FTM packet 240 to include a time stamp with the value t1_1. In other embodiments, AP1 does not include a time stamp with the value t1_1 in the FTM packet 240.

At time t2_1, AP2 receives the FTM packet 240. In an embodiment, AP2 records the time t2_1 at which the FTM packet 240 was received at AP2. In other embodiments, AP2 does not record the time t2_1 at which the FTM packet 240 was received.

The observing station 212 also receives the FTM packet 240 at time t2_obs_1, and the observing station 212 records the time t2_obs_1. In an embodiment, the time t2_obs_1 corresponds to an event at which a beginning of the FTM packet 240 is received at the observing station 212.

In response to the FTM packet 240, AP2 generates and transmits an ACK packet 244. AP2 transmits the ACK packet 244 at a time t3_1. In an embodiment, time t3_1 corresponds to t2_1+T_ack. In an embodiment, AP2 records the time t3_1 at which AP2 transmits the ACK packet 244. In other embodiments, AP2 does not record the time t3_1. In some embodiments, t3_1 is greater than t2_1+T_ack. For example, processing delays in AP2 may result in t3_1 being greater than t2_1+T_ack.

At time t4_1, AP1 receives the ACK packet 244. In an embodiment, AP1 records the time t4_1 at which AP1 receives the ACK packet 244. In an embodiment, the time t4_1 corresponds to an event at which a beginning of the ACK packet 244 is received at AP1.

The observing station 212 also receives the ACK packet 244 at time t4_obs_1, and the observing station 212 records the time t4_obs_1. In an embodiment, the time t4_obs_1 corresponds to an event at which a beginning of the ACK packet 244 is received at the observing station 212.

Transmission of an FTM packet and a responsive ACK packet (e.g., the FTM packet 240 and the responsive ACK packet 244) is sometimes referred to herein as an FTM exchange. Thus, the FTM packet 240 and the responsive ACK packet 244 correspond to one FTM exchange.

In some embodiments, an FTM signal exchange burst procedure comprises multiple FTM exchanges. For instance, FIG. 2B illustrates a second FTM signal exchange. In particular, as part of the second FTM exchange, AP1 generates an FTM packet 248 (FTM_2). At a time t1_2, AP1 transmits the FTM packet 248, and AP1 records the time t1_2. In an embodiment, the time t1_2 corresponds to an event at which a beginning of the FTM packet 248 is transmitted. In an embodiment, AP1 generates the FTM packet 248 to include a time stamp with the value t1_2. In other embodiments, AP1 does not include a time stamp with the value t1_2 in the FTM packet 248. In an embodiment, AP1 generates the FTM packet 248 to include times t1_1 and t4_1, e.g., in a PHY payload portion of the FTM packet 248.

At time t2_2, AP2 receives the FTM packet 248. In an embodiment, AP2 records the time t2_2 at which the FTM packet 248 was received at AP2. In other embodiments, AP2 does not record the time t2_2 at which the FTM packet 248 was received.

The observing station 212 also receives the FTM packet 248 at time t2_obs_2, and the observing station 212 records the time t2_obs_2. In an embodiment, the time t2_obs_2 corresponds to an event at which a beginning of the FTM packet 248 is received at the observing station 212. As discussed above, in an embodiment, the FTM packet 248 includes times t1_1 and t4_1, e.g., in a PHY payload portion of the FTM packet 248. Thus, in an embodiment, the observing station 212 records the times t1_1 and t4_1 that were included in the FTM packet 248.

In response to the FTM packet 248, AP2 generates and transmits an ACK packet 252. In an embodiment, AP2 transmits the ACK packet 252 at a time t3_2. In an embodiment, time t3_2 corresponds to t2_2+T_ack. In an embodiment, AP2 records the time t3_2 at which AP2 transmits the ACK packet 252. In other embodiments, AP2 does not record the time t3_2. In some embodiments, t3_2 is greater than t2_2+T_ack. For example, processing delays in AP2 may result in t3_2 being greater than t2_2+T_ack.

At time t4_2, AP1 receives the ACK packet 252. In an embodiment, AP1 records the time t4_2 at which AP1 receives the ACK packet 252. In an embodiment, the time t4_2 corresponds to an event at which a beginning of the ACK packet 252 is received at AP1.

The observing station 212 also receives the ACK packet 252 at time t4_obs_2, and the observing station 212 records the time t4_obs_2. In an embodiment, the time t4_obs_2 corresponds to an event at which a beginning of the ACK packet 252 is received at the observing station 212.

The times t1, t2, t3, t4, t2_obs, and t4_obs are recorded at AP1, AP2, and observing station 212 using respective local timers. For example, in an embodiment, times t1, t2, t3, and t4 are recorded using respective local FTM timers. In other embodiments, times t1, t2, t3, and t4 are recorded using respective local TSF timers.

A group of FTM exchanges is referred to herein as an FTM burst. For example, an FTM burst 270 includes the two FTM exchanges associated with FTM_1, and FTM_2. In an embodiment, an FTM burst may include other suitable number of FTM exchanges, such as one, three, four, five, six, etc. In an embodiment, one or more FTM bursts can follow an initial FTM burst. For example, an FTM burst 270 can be followed a second FTM burst 290. In an embodiment, an FTM procedure can include other suitable number of FTM bursts, such as three, four, five, six, etc.

A location of the observing station 212 can be determined in part with a differential distance $D_{SR}$ between the observing station 212 and each of AP1 and AP2, where $$D_{SR}=c\times(T_{SO}-T_{RO})\qquad\text{Equation 1}$$

where c is the speed of light, $T_{SO}$ is a time of flight between AP1 and the observing station 212, and $T_{RO}$ is a time of flight between AP2 and the observing station 212. In some embodiments, a location of the observing station 212 can be determined using i) $D_{SR}$, and ii) a) a known location of AP1, and/or b) a known location of AP2.

In an embodiment, the differential distance $D_{SR}$ between the observing station 212 and each of AP1 and AP2 can be calculated as $$D_{SR}=c\times(t4\_obs-t2\_obs-T-(t4-t1))\qquad\text{Equation 2}$$

where t4_obs is one of t4_obs_1, t4_obs_2, and t4_obs_3; t2_obs is one of t2_obs_1, t2_obs_2, and t2_obs_3; t4 is one of t4_1, t4_2, and t4_3; t1 is one of t1_1, t1_2, and t1_3; and T is a time of flight of a line of sight transmission from AP1 to AP2. In an embodiment, T is calculated as $$T=(t4-t1-T\_ack)*0.5\qquad\text{Equation 3}$$

In other embodiments, T is calculated as $$T=t2-t1\qquad\text{Equation 4}$$

where t2 is one of t2_1, t2_2, and t2_3. In another embodiment, when the locations of AP1 and AP2 are known, T is calculated by dividing the distance between AP1 and AP2 by the speed of light c.

In various embodiments, $D_{SR}$ is calculated at one or more of AP1, AP2, the observing station 212, or another suitable device (not shown in FIG. 2A). Thus, in various embodiments, time values and other parameters (if any) necessary for calculating $D_{SR}$ are sent to the device calculating the $D_{SR}$ (the "calculating device") if the calculating device does not already have the time values/parameters.

As shown in the example of FIG. 2B, AP2 merely responds to FTM packets from AP1 with ACKs. Thus, in some embodiments, AP2 is not configured to transmit FTM signals and/or initiate FTM exchanges. For example, in an embodiment, the AP2 is a legacy device that is configured to support an older communication protocol (e.g., IEEE 802.11a), whereas FTM exchanges are defined by a more recent communication protocol that is backward compatible with the older communication protocol. Thus, for example, AP2 responds to FTM packets from AP1 with ACKs but may not be able to understand all of the contents of the FTM packets. In other embodiments, however, AP2 is able to understand all of the contents of the FTM packets from AP1.

Observing, by a first communication device, of FTM packet exchanges between a second communication device and a third communication device for range measurement purposes, such as discussed above in connection with FIGS. 2A and 2B is sometimes referred to as "snoop-based range measurement." Various methods of snoop-based range measurements are described in U.S. patent application Ser. No. 15/041,911, filed on Feb. 11, 2016, the disclosure of which is hereby expressly incorporated herein by reference in its entirety.

To facilitate the observing station 212 in observing FTM exchanges between AP1 and AP2, AP1 may transmit FTM scheduling information to the observing station 212, where the FTM scheduling information provides information regarding when the FTM burst 270 will occur. In some embodiments, AP1 transmits FTM scheduling information in one or more beacon frames, and the observing station 212 obtains the FTM scheduling information from the one or more beacon frames. In some embodiments, AP1 transmits FTM scheduling information in one or more broadcast packets, and the observing station 212 obtains the FTM scheduling information from the one or more broadcast packets. In some embodiments, the observing station 212 transmits a request packet to AP1, the request packet including information that prompts AP1 to transmit FTM scheduling information in one or more FTM response packets to the observing station 212. The observing station 212 obtains the FTM scheduling information from the one or more FTM response packets, in some embodiments.

Figure 2C:
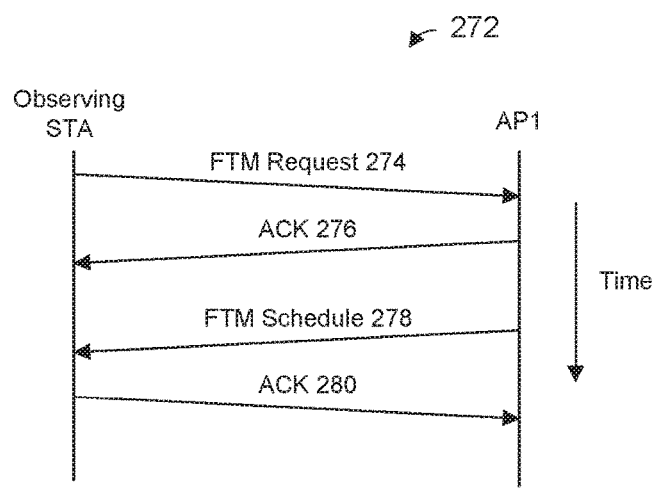
FIG. 2C is a signal timing diagram illustrating an example exchange of signals between an access point and an observing station of FIG. 2A, according to an embodiment.

FIG. 2C is a signal timing diagram showing a signal exchange 272, between the observing station 212 and the AP1, that is used to transmit FTM scheduling information to the observing station 212. In an embodiment, the signal exchange 272 occurs prior to the FTM procedure 216. In an embodiment, the observing station 212 transmits an FTM request packet 274 to AP1. In an embodiment, the FTM request packet 274 includes information that notifies AP1 that the observing station 212 intends to perform snoop-based range measurement based on one or more FTM bursts, such as the FTM burst 270 between AP1 and AP2. The AP1 responds to the FTM request packet 274 with an ACK packet 276. The AP1 then transmits an FTM schedule packet 278 to the observing station 212. In an embodiment, the FTM schedule packet 278 includes scheduling information in relation to one or more FTM bursts defined by FTM service period start time, the duration of FTM service period, and the interval between two FTM service periods, such as the FTM burst 270 between AP1 and AP2. The scheduling information is utilized by the observing station 212 to determine the schedule of one or more FTM bursts. After receiving the FTM schedule packet 278, the observing station 212 transmits an ACK packet 280 acknowledging the receipt of the FTM schedule packet 278.

Each of the observing station 212 and the AP1 uses a respective local timer (e.g., timer 146 and timer 186) to determine when FTM transmissions are transmitted and received, according to some embodiments. For instance, an observing station 212 uses its TSF timer to determine the start of a burst period. When the local TSF timers of observing station 212 and the AP1 are not synchronized, this may cause a mismatch between when the observing station 212 expects FTM exchanges in an FTM burst to occur and when the AP1 and the AP2 engage in such FTM exchanges. For example, because of the local TSF timers of observing station 212 and AP1 are unsynchronized, an ambiguity exists regarding when the burst period starts. Similarly, because of the local TSF timers of the observing station 212 and AP1 are unsynchronized, an ambiguity exists regarding when the burst period ends. As a result, the observing station 212 may needlessly wait during a burst start ambiguity period for the FTM packet 240, or may miss transmission of the FTM packet 240. Additionally, the observing station 212 may stop listening before the end of the burst period 270, or may needlessly wait for more transmissions after the burst period 270 has ended. Loss of synchronization between times of different communication devices is often caused by clock drift. In some situations, the local TSF timer of the observing station 212 and the local TSF timer of the AP1 can drift apart by as much as ±200 ppm.

Similarly, as FTM timers become more unsynchronized, ToF calculations become less accurate.

Thus, to better synchronize local timers of communication devices, several example clock synchronization approaches described below may be utilized. For ease of explanation, example clock synchronization techniques are described in the context of AP 114-1 acting as AP1 and the client station 154-1 acting as observing station. In other embodiments, the clock synchronization techniques are implemented by other suitable communication devices.

Figure 3:
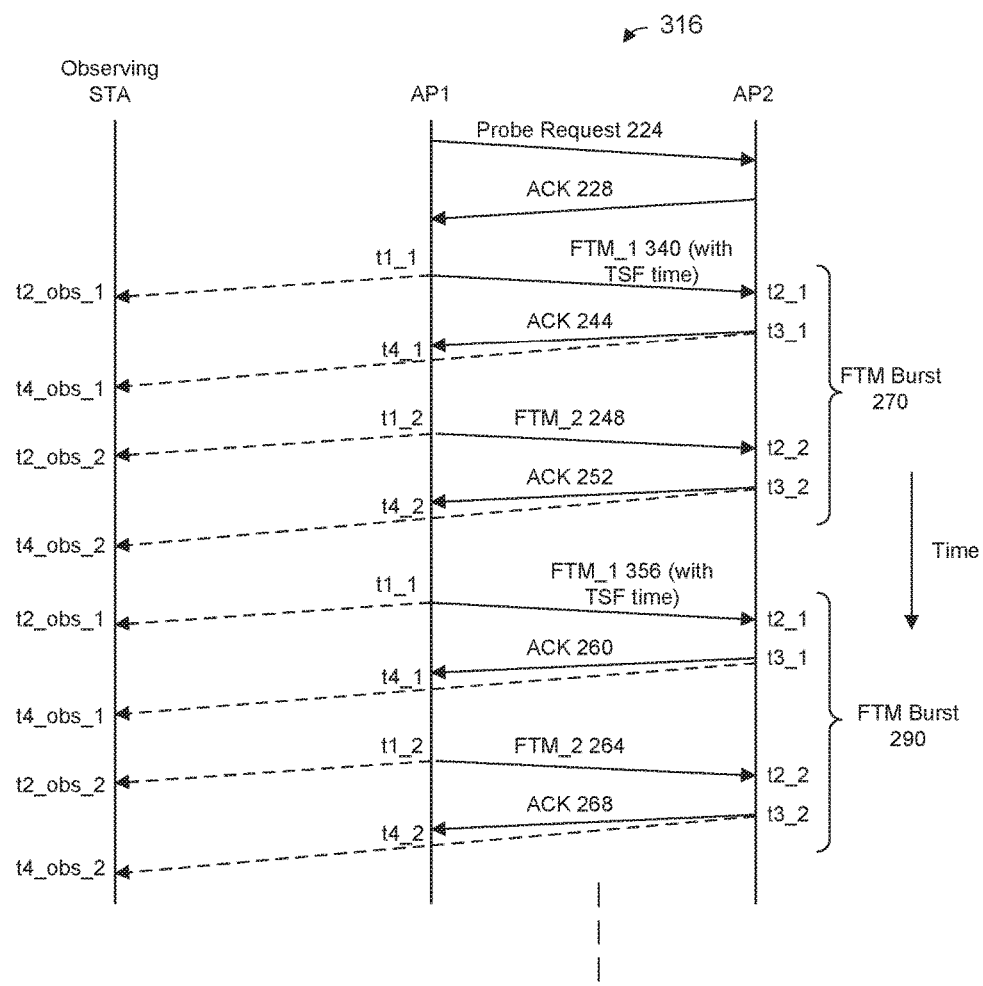
FIG. 3 is a signal timing diagram illustrating an example technique of adjusting time values of a timer of a communication device, according to an embodiment.

FIG. 3 is a signal timing diagram illustrating an example FTM procedure 316 between AP1 and AP2, in which the observing station 212 observes FTM signal exchanges between AP1 and AP2 for range measurement purposes, according to an embodiment. The FTM procedure 316 is similar to the FTM procedure described above in connection with FIG. 2B, and like-numbered elements are not discussed in detail for purposes of brevity.

An FTM packet in a burst (e.g. an FTM packet 340 in an FTM burst 270) includes timing information that is used by the observing station 212 to synchronize its TSF timer. For example, AP1 records a time corresponding to when the transmission of the FTM packet 340 is initiated. In an embodiment, the FTM controller 142 records a value of the TSF timer value when the FTM controller 142 prompts the MAC processor (e.g., the MAC processor 126) and/or the PHY processor (e.g., the PHY processor 130) of AP1 to transmit the FTM packet. Optionally, in another embodiment, the AP1 adjusts the recorded time to account for a delay between when the FTM controller 142 prompts transmission of the FTM packet and when the FTM packet is transmitted. The FTM controller 142 includes the recorded TSF timer value in the FTM packet 340.

The observing station 212 receives the FTM packet 340 with the recorded TSF timer value (TSF time value) and, based on the TSF time value in the FTM packet 340, the observing station 212 adjusts the TSF timer of the observing station 212 to synchronize the TSF timer of the observing station 212 with the TSF timer of AP1. For example, the observing station 212 may record a value of the TSF timer of the observing station 212 corresponding to when the FTM packet 340 is received by the observing station 212. Then, the observing station 212 calculates an offset based on a comparison between the TSF time value in the FTM packet 340 and the recorded TSF timer value corresponding to when the observing station 212 received the FTM packet 340. In an embodiment, the offset is further calculated based on other factors such as an estimated delay between when the FTM controller 182 of the observing station 212 received the FTM packet 340 and when the FTM controller 142 of AP1 recorded the TSF time value included in the FTM packet 340. In an embodiment, the estimated delay is calculated based on one or more of i) an estimated time of flight between AP1 and observing station 212, ii) an estimated delay between when the FTM controller 142 of AP1 instructed the MAC processor 126 to transmit the communication frame and when the PHY processor 130 actually transmitted the communication frame, etc.

In an embodiment, a frame in an FTM burst that carries a TSF timer value of AP1 can be a probe response frame or any other suitable management frame that includes a TSF timer value, e.g. a traffic indication map (TIM) frame. In an embodiment, a simplified probe response frame includes only the TSF timer value, with other elements of a typical probe response frame omitted. Such a probe response frame is referred to herein as a "simplified probe response" or a "synchronization probe response."

The above process may repeat for future FTM bursts (e.g. FTM burst 290). For example, FTM packet 356 also includes timing information such as described above with respect to the FTM packet 340, and observing station 212 adjusts the TSF timer of the observing station 212 using the timing information in the FTM packet 356.

Figure 4:
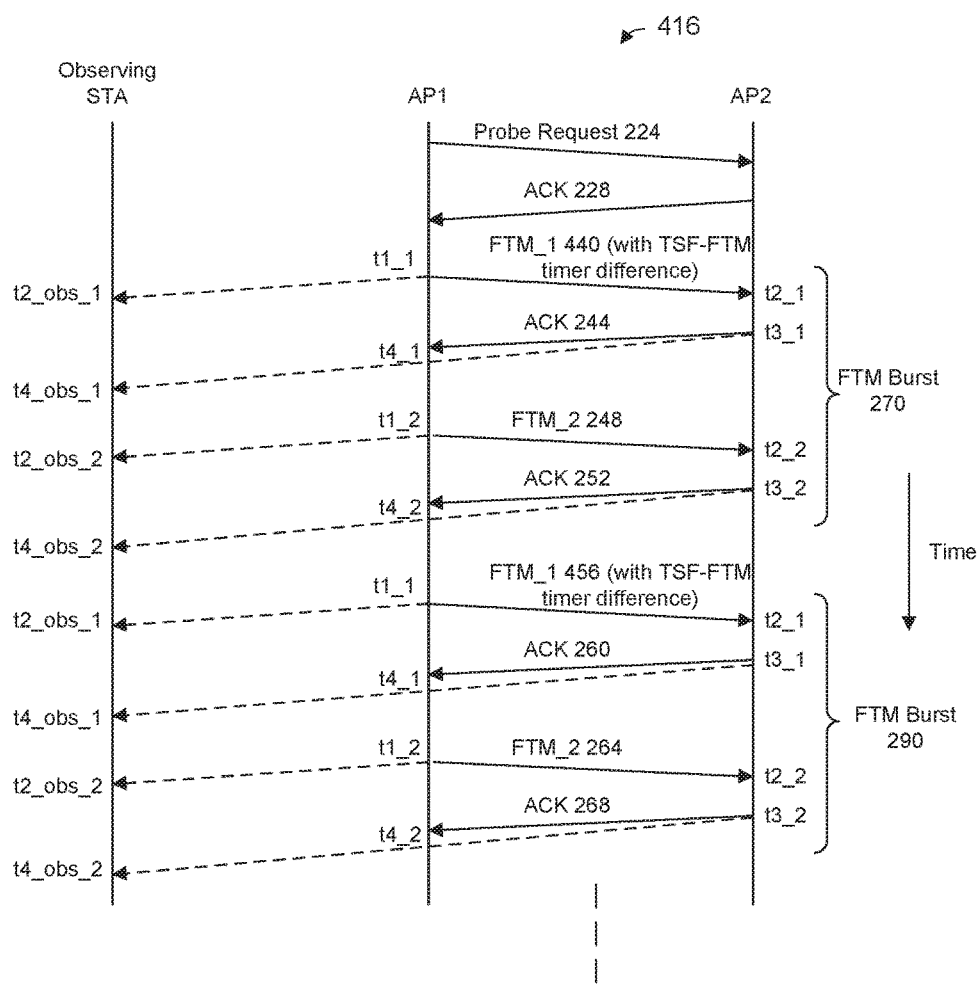
FIG. 4 is a signal timing diagram illustrating another example technique of adjusting time values of a timer of a communication device, according to an embodiment.

FIG. 4 is a signal timing diagram illustrating another example FTM procedure 416 between AP1 and AP2, in which the observing station 212 observes FTM signal exchanges between AP1 and AP2 for range measurement purposes, according to another embodiment. The FTM procedure 416 is similar to the FTM procedure 216 described in connection with FIG. 2B, and like-numbered elements are not discussed in detail for purposes of brevity.

An FTM packet in a burst (e.g. an FTM packet 440 in an FTM burst 270) includes timing information that is used by the observing station 212 to synchronize its TSF timer. In an embodiment, AP1 records a time corresponding to when the transmission of the FTM packet 440 is initiated. For example, in an embodiment, the FTM controller 142 records a value of the TSF timer when the FTM controller 142 prompts the MAC processor (e.g., the MAC processor 126) and/or the PHY processor (e.g., the PHY processor 130) of AP1 to transmit the FTM packet. The FTM controller 142 also records a value of the FTM timer corresponding to when to the FTM controller 142 prompts the MAC processor (e.g., the MAC processor 126) and/or the PHY processor (e.g., the PHY processor 130) of AP1 to transmit the FTM packet. In an embodiment, one or more of the recorded values of the TSF timer and the FTM timer are adjusted to account for a delay between when the FTM controller 142 prompts transmission of the FTM packet and when the FTM packet is transmitted.

The FTM controller 142 then determines a difference (sometimes referred to herein as a TSF-FTM timer difference) between the recorded TSF timer value (TSF time) and the recorded FTM timer value (FTM time). In some embodiments, not all bits of the TSF time are used to calculate the TSF-FTM timer difference. For instance, as an illustrative example, if the FTM time consists of 32 bits and the TSF time consists of 48 bits, only 32 least significant bits (LSBs) of the TSF time are used to calculate the TSF-FTM timer difference. In an embodiment, the TSF-FTM timer difference is represented using i) a set of bits (e.g., 32 bits or another suitable number of bits) that represents a magnitude of the difference, and ii) a sign bit indicating a sign of the difference.

When the FTM controller 142 initiates or prompts transmission of the FTM packet 440, the FTM controller 142 includes the TSF-FTM timer difference in the FTM packet 440. The FTM controller 142 also includes an indication of the recorded TSF time in the FTM packet 440. In an embodiment, the indication of the recorded TSF time consists of bits of the recorded TSF time (e.g., most significant bits (MSBs) that were not used to calculate the TSF-FTM timer difference. For instance, when the TSF time consists of 48 bits and 32 LSBs were used to calculate the TSF-FTM timer difference, the FTM controller 142 includes 16 MSBs of the TSF time in the FTM packet 440.

The FTM controller 142 then transmits another FTM packet 248. As described above with respect to FIG. 2, the FTM packet 248 includes times t1_1 and t4_1.

The observing stations receive the FTM packet 240 and the FTM packet 248. The observing station 212 uses timing information in the FTM packet 440 and FTM packet 248 to synchronize the TSF time of the observing station 212 to the TSF timer of AP1. In an embodiment, the observing station 212 synchronizes the TSF timer using the i) TSF-FTM timer difference and the MSBs of the TSF time not used to calculate the TSF-FTM timer difference included in FTM packet 440 and ii) time t1_1 included in FTM packet 248. For instance, when the TSF time consists of 48 bits and the TSF-FTM timer difference corresponds to 32 LSBs of the TSF time of AP1, the observing station 212 synchronizes the TSF timer based on a sum TSF_MSB16*2^32+TSF-FTM timer difference+t1_1+Dur_FTM2_FTM1, wherein TSF_MSB16 represents the 16 MSBs of the TSF time, and Dur_FTM2_FTM1 is a known duration of time between the t1_1 and t1_2. In an embodiment, an indication of Dur_FTM2_FTM1 is included in the packet 278 (FIG. 2C). In some embodiments, the TSF timer of the observing station 212 is further adjusted based on other suitable factors, such as an estimated time of flight between AP1 and the observing station 212.

The above process may be repeated for subsequent FTM bursts (e.g. FTM burst 290). FTM packet 456 can also carry timing information for TSF timer synchronization similar to that described above with respect to FTM burst 270. For instance, the FTM packet 456 includes a difference between TSF time and FTM time corresponding to the transmission of the FTM packet 456. Based on the difference in FTM packet 456, the observing station 212 synchronizes its TSF timer.

Figure 5:
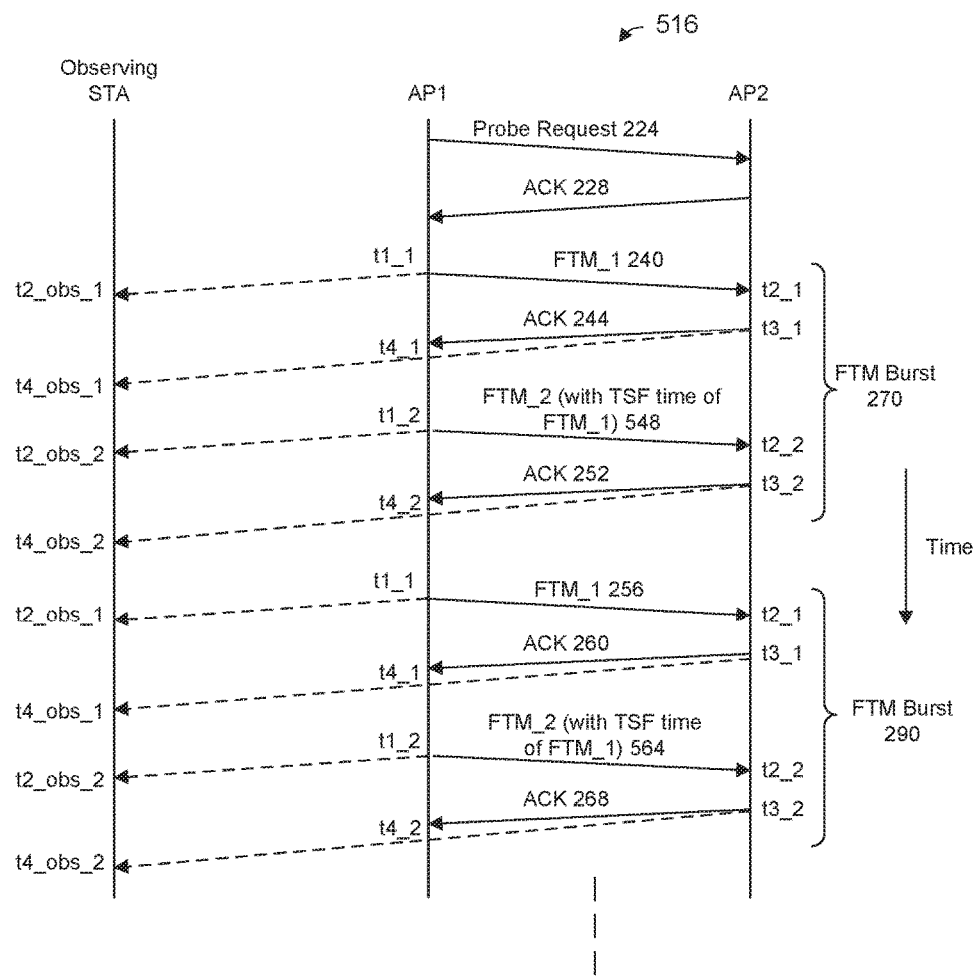
FIG. 5 is a signal timing diagram illustrating another example technique of adjusting time values of a timer of a communication device, according to an embodiment.

FIG. 5 is a signal timing diagram illustrating an example FTM procedure 516 between AP1 and AP2, in which the observing station 212 observes FTM signal exchanges between AP1 and AP2 for range measurement purposes. The FTM procedure 516 is similar to the FTM procedure 216 described above, and like-numbered elements are not described in detail for purposes of brevity. In an embodiment, the FTM procedure 516 is utilized by the client station 212 to synchronize the TSF timer of the client station 212 to the TSF timer of AP1.

In an embodiment, AP1 records a TSF time corresponding to when the transmission of the FTM packet 240 is actually transmitted, as opposed to a time when the FTM controller 142 prompts the MAC processor 126 to transmit the FTM packet 240. AP1 then includes the recorded TSF timer value (TSF time of FTM_1) in an FTM packet 548 in the FTM burst 270.

The observing station receives the FTM packet 548 and, based on the recorded TSF time of FTM_1 in the FTM packet 548, the observing station 212 synchronizes the TSF timer of the observing station 212. In an embodiment, the observing station 212 sets the TSF timer of the observing station 212 based on a sum of the recorded TSF time of FTM_1 in the FTM packet 548 and Dur_FTM2_FTM1.

The above process may repeat for future FTM bursts (e.g. FTM burst 290). FTM packet 564 can also carry timing information for TSF timer synchronization similar to that described above with respect to FTM burst 270. For instance, the FTM packet 564 includes a recorded TSF timer value corresponding to the transmission of the FTM packet 256. Based on the recorded TSF timer value in 564, the observing station 212 synchronizes the TSF timer of the observing station 212.

In some embodiments described above with respect to FIGS. 3-5, synchronizing TSF timer values at the observing station 212 comprises calculating a value of the TSF timer value and setting the TSF timer to the calculated TSF timer value. In some embodiments described above with respect to FIGS. 3-5, synchronizing TSF timer values at the observing station 212 comprises calculating an offset, and then adjusting the TSF timer using the calculated offset. For example, synchronizing the TSF timer values at the observing station 212 comprises calculating an offset, and then advancing (or turning back) the TSF timer using the offset.

Figure 6:
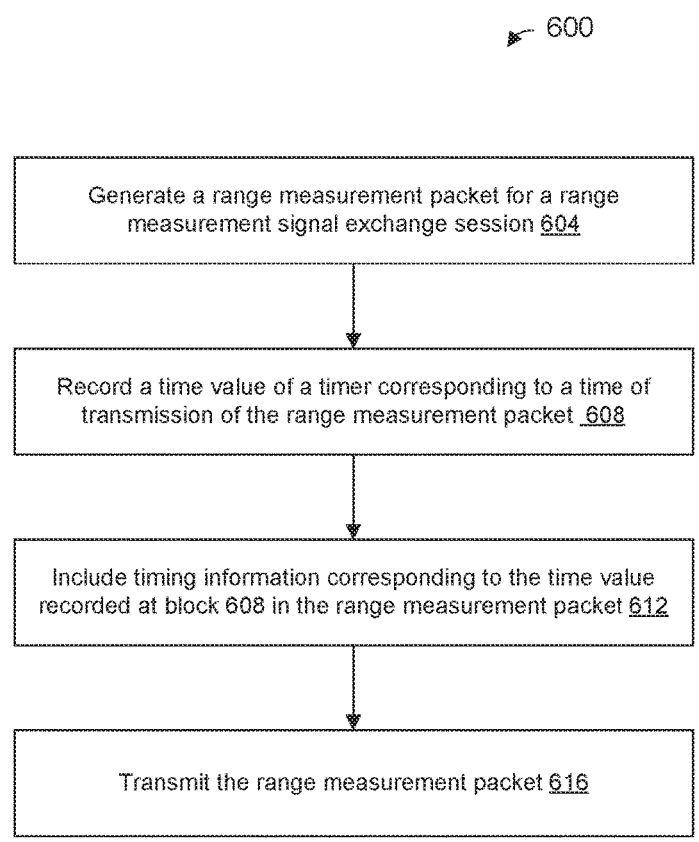
FIG. 6 is a flow diagram of an example method of providing timing information for adjusting a timer of a communication device, according to an embodiment.

FIG. 6 is a flow diagram of an example method 600 for providing timing information for adjusting a timer that is used in connection with a range measurement procedure, according to an embodiment. In some embodiments, the network interface device 122 of FIG. 1 is configured to implement the method 600. The method 600 is described in the context of the network interface device 122 merely for explanatory purposes and, in other embodiments, the method 600 is implemented by another suitable device.

At block 604, the network interface device 122 generates a range measurement packet (or a packet that includes a probe response frame, a TIM frame, etc.) associated with a range measurement signal exchange session between the AP 114-1 and a second communication device (e.g., the AP 114-2).

At block 608, the network interface device 122 records a time value of a timer of the network interface device 122 corresponding to a time of transmission of the range measurement packet by the AP 114-1. For example, the FTM controller 142, or another suitable device within the network interface 122 (e.g., the MAC processor 126, the PHY processor 130, etc.), records a time value of the TSF timer corresponding to when the FTM controller 142 sends an FTM request prompt to the MAC processor (e.g., the MAC processor 126) and/or the PHY processor (e.g., the PHY processor 130. As another example, the FTM controller 142, or another suitable device within the network interface 122 (e.g., the MAC processor 126, the PHY processor 130, etc.), records a time value of the TSF timer corresponding to a time when the FTM packet 240 will be transmitted by the AP 114-1.

At block 612, the network interface device 122 includes timing information corresponding to the time value recorded at block 608 in the range measurement packet (or the packet that includes the probe response frame, the TIM frame, etc.). In various embodiments, methods described above with respect to FIGS. 3 and 4 are utilized to determine the timing information based on the time value recorded at block 608.

For example, the timing information corresponding to the time value recorded at block 608 may include the time value recorded at block 608. As another example, the timing information corresponding to the time value recorded at block 608 may include only a subset of bits (i.e., not all of the bits) of the time value recorded at block 608. For instance, the subset of bits may comprise a set of MSBs of the time value. As an illustrative example, when the time value consists of 48 bits, the timing information includes only the 16 MSBs (i.e., the other 32 bits of the time value are excluded from the timing information).

In some embodiments, the network interface device 122 includes other timing information in the range measurement packet. For example, when the time value recorded at block 608 corresponds to a TSF timer, the network interface device 122 may also record an FTM timer value corresponding to the TSF timer value recorded at block 608; and the network interface device 122 may include in the range measurement packet a difference value (e.g., a TSF-FTM timer difference) between the recorded TSF timer value and the recorded FTM timer value.

At block 616, the network interface device 122 transmits the range measurement packet (or the packet that includes thea probe response frame, the TIM frame, etc.) to the second communication device. A third communication device (e.g., client device 154-1) may then use the timing information in the packet to synchronize a timer of the network interface device 122 using methods such as described above, or using another suitable method.

Figure 7:
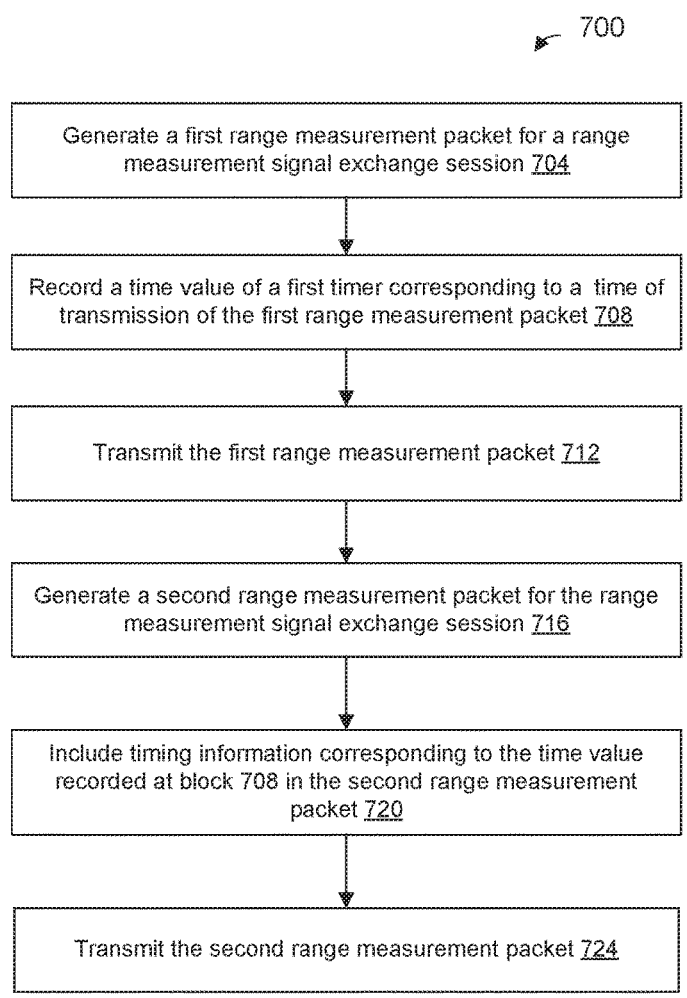
FIG. 7 is a flow diagram of another example method of providing timing information for adjusting a timer of a communication device, according to an embodiment.

FIG. 7 is a flow diagram of an example method 700 for providing timing information for adjusting a timer that is used in connection with a range measurement procedure, according to an embodiment. In some embodiments, the network interface device 122 of FIG. 1 is configured to implement the method 700. The method 700 is described in the context of the network interface device 122 merely for explanatory purposes and, in other embodiments, the method 700 is implemented by another suitable device.

At block 704, the network interface device 122 generates a first range measurement packet (or a packet that includes a probe response frame, a TIM frame, etc.) associated with a range measurement signal exchange session between the AP 114-1 and a second communication device (e.g., the AP 114-2).

At block 708, the network interface device 122 records a time value of a timer of the network interface device 122 corresponding to a time of transmission of the first packet by the AP 114-1. For example, the FTM controller 142, or another suitable device within the network interface 122 (e.g., the MAC processor 126, the PHY processor 130, etc.), records a time value of the TSF timer corresponding to when the FTM controller 142 sends an FTM request prompt to the MAC processor (e.g., the MAC processor 126) and/or the PHY processor (e.g., the PHY processor 130). As another example, the FTM controller 142, or another suitable device within the network interface 122 (e.g., the MAC processor 126, the PHY processor 130, etc.), records a time value of the TSF timer corresponding to a time when the packet will be transmitted by the AP 114-1.

At block 712, the network interface device 122 transmits the first packet to the second communication device.

At block 716, the network interface device 122 generates a second range measurement packet (or a packet that includes a probe response frame, a TIM frame, etc.) associated with the range measurement signal exchange session between the AP 114-1 and a second communication device (e.g., the AP 114-2).

At block 720, the network interface device 122 includes timing information corresponding to the time value recorded at block 708 in the second packet. In various embodiments, methods described above with respect to FIG. 5 are utilized to determine the timing information based on the time value recorded at block 708. For example, the timing information may include the time value recorded at block 708.

At block 724, the network interface device 122 transmits the second packet to the second communication device. A third communication device (e.g., client device 154-1) may then use the timing information in the second range measurement packet to synchronize a timer of the network interface device 122 using methods such as described above, or using another suitable method. For example, in an embodiment, the timing information is used by an FTM controller (such as FTM controller 182) of the client device 154-1 to synchronize its TSF timer to the timer of the network interface device 122 of AP 114-1.

Figure 8:
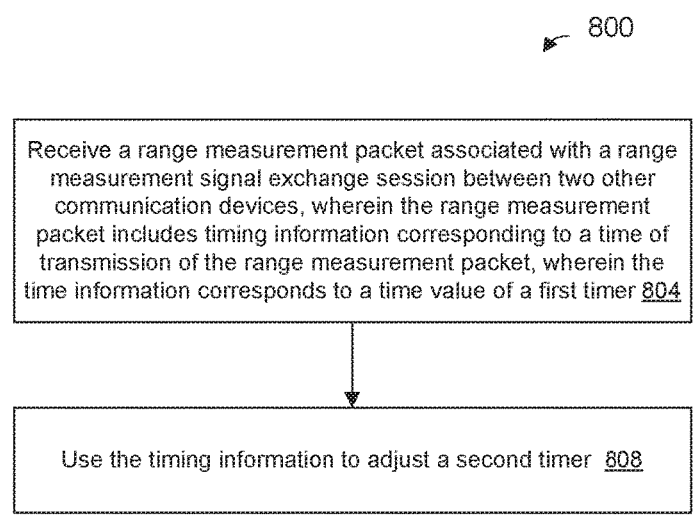
FIG. 8 is a flow diagram of an example method of adjusting a timer of a communication device, according to an embodiment.

FIG. 8 is a flow diagram of an example method 800 for adjusting a timer that is used in connection with a range measurement procedure, according to an embodiment. In some embodiments, the network interface device 162 of FIG. 1 is configured to implement the method 800. The method 800 is described in the context of the network interface device 162 merely for explanatory purposes and, in other embodiments, the method 800 is implemented by another suitable device.

At block 804, the network interface device 162 receives a range measurement packet (or a packet that includes a probe response frame, a TIM frame, etc.) associated with a range measurement signal exchange session between the AP 114-1 and a second communication device (e.g., the AP 114-2). The packet includes timing information corresponding to a time of transmission of the range measurement packet as measured by the AP 114-1. For instance, the timing information corresponds to a recorded time value of a first timer at the AP 114-1. In various embodiments, methods described above with respect to FIGS. 3, 4, and 6 are utilized to generate the timing information included in the packet received at the network interface device 162.

At block 808, the network interface device 162 uses the timing information in the packet to adjust time value corresponding to a second timer at the network interface device 162. For example, in an embodiment, the timing information is used by an FTM controller (such as FTM controller 182) of the network interface device 162 to synchronize its TSF timer to the first timer at the AP 114-1. In various embodiments, methods described above with respect to FIGS. 3 and 4 are utilized at the network interface device 162 to adjust time values corresponding to the second.

Figure 9:
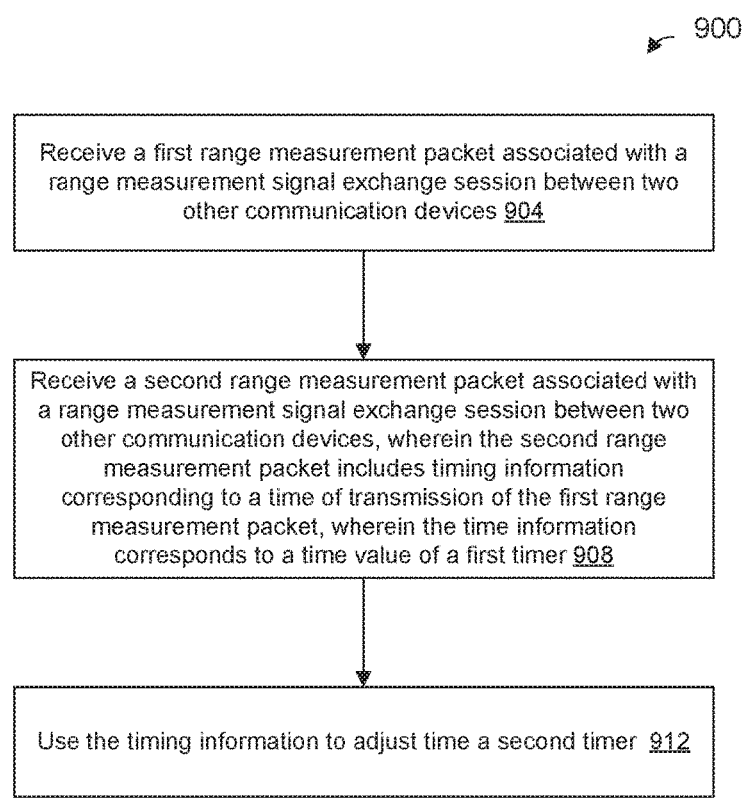
FIG. 9 is a flow diagram of another example method of adjusting a timer of a communication device, according to an embodiment.

FIG. 9 is a flow diagram of an example method 900 for adjusting a timer that is used in connection with a range measurement procedure, according to an embodiment. In some embodiments, the network interface device 162 of FIG. 1 is configured to implement the method 900. The method 900 is described in the context of the network interface device 162 with the FTM controller 182 and timer 186 merely for explanatory purposes and, in other embodiments, the method 900 is implemented by another suitable device.

At block 904, the network interface device 162 receives a first range measurement packet (or a packet that includes a probe response frame, a TIM frame, etc.) associated with a range measurement signal exchange session between the AP 114-1 and a second communication device (e.g., the AP 114-2).

At block 908, the network interface device 162 receives a second range measurement (or a packet that includes a probe response frame, a TIM frame, etc.) packet associated with the range measurement signal exchange session between the AP 114-1 and a second communication device (e.g., the AP 114-2). The second packet includes timing information corresponding to a time of transmission of the first packet. For instance, the timing information corresponds to a recorded time value of a first timer at the AP 114-1. In various embodiments, methods described above with respect to FIGS. 5 and 7 are utilized to generate the timing information included in the second range measurement packet received at the network interface device 162.

At block 912, the network interface device 162 uses the timing information in the second packet to adjust time value corresponding to a second timer at the network interface device 162. For example, in an embodiment, the timing information is used by an FTM controller (such as FTM controller 182) of the network interface device 162 to synchronize its TSF timer to the first timer at the AP 114-1. In various embodiments, methods described above with respect to FIG. 5 are utilized at the network interface device 162 to adjust time values corresponding to the second timer.

In an embodiment, a method includes: generating, at a first communication device, a packet associated with a range measurement signal exchange session between the first communication device and a second communication device; recording, at the first communication device, a time value of a first timer corresponding to a time of transmission of the packet; including, at the first communication device, timing information corresponding to the recorded time value in the packet; and transmitting, from the first communication device, the packet to the second communication device, wherein the timing information in the packet is useable by a third communication device to adjust time values corresponding to a second timer, wherein the third communication device includes the second timer.

In other embodiments, the method includes one of, or any suitable combination of two or more of, the following features.

The recorded time value of the first timer is a time corresponding to when the transmission of the packet is initiated at the second communication device.

The recorded time value of the first timer is a time corresponding to when the packet is transmitted from the second communication device.

The first timer is used at the first communication device to determine a start time of the range measurement signal exchange session, and the second timer is used at the second communication device to determine the start time of the range measurement signal exchange session.

The timing information includes the recorded time value of the first timer at the first communication device.

The timing information includes a difference between a first set of bits corresponding to the recorded time value of the first timer and a time value of a third timer at the first communication device.

The timing information further includes a second set of bits corresponding to the recorded time value of the first timer at the first communication device, wherein the second set of bits does not include any of the first set of bits.

The packet is a range measurement packet.

The packet includes one of a probe response frame or a traffic indication map (TIM) frame.

In another embodiment, an apparatus comprises a network interface device associated with a first communication device. The network interface device includes one or more integrated circuits (ICs) configured to: generate a packet associated with a range measurement signal exchange session between the first communication device and a second communication device; record a time value of a first timer corresponding to a time of transmission of the packet; include, in the packet, timing information corresponding to the recorded time value; and transmit the packet to the second communication device, wherein the timing information in the packet is useable by a third communication device to adjust time values corresponding to a second timer, wherein the third communication device includes the second timer.

In other embodiments, the apparatus further comprises one of, or any suitable combination of two or more of, the following features.

The recorded time value of the first timer is a time corresponding to when the transmission of the packet is initiated at the second communication device.

The recorded time value of the first timer is a time corresponding to when the packet is transmitted from the second communication device.

The first timer is used at the first communication device to determine a start time of the range measurement signal exchange session, and the second timer is used at the second communication device to determine the start time of the range measurement signal exchange session.

The timing information includes the recorded time value of the first timer at the first communication device.

The timing information includes a difference between a first set of bits corresponding to the recorded time value of the first timer and a time value of a third timer at the first communication device.

The timing information further includes a second set of bits corresponding to the recorded time value of the first timer at the first communication device, wherein the second set of bits does not include any of the first set of bits.

The packet is a range measurement packet.

The packet includes one of a probe response frame or a traffic indication map (TIM) frame.

In yet another embodiment, a method is implemented at a first communication device that includes a first timer and a second timer. The first timer is used by the first communication device to estimate a start time of a range measurement signal exchange session between the first communication device and a second communication device, and the second timer is used by the first communication device to determine at least times of departure of range measurement packets associated with the range measurement signal exchange session at the first communication device. The method includes: generating, at the first communication device, a first range measurement packet for the range measurement signal exchange session between the first communication device and the second communication device; recording, at the first communication device, a time value of the first timer corresponding to a time of transmission of the range measurement packet; transmitting, from the first communication device, the first range measurement packet; generating, at the first communication device, a second range measurement packet for the range measurement signal exchange session between the first communication device and the second communication device; include, at the first communication device, timing information corresponding to the recorded time value of the first timer in the second range measurement packet; and transmitting, from the first communication device, the second range measurement packet associated with the range measurement signal exchange session, wherein the timing information in the second range measurement packet is useable by a third communication device to adjust a third timer, wherein the third communication device includes the third timer, and wherein the third timer is used by the third communication device to estimate a start time of a next range measurement signal exchange session between the first communication device and the second communication device.

In other embodiments, the method includes one of, or both of, the following features.

A time interval between the first range measurement packet and the second range measurement packet is useable by the third communication device to adjust the third timer of the third communication device.

The timing information includes the recorded time value of the first timer.

In still another embodiment, an apparatus comprises a network interface device associated with a first communication device. The network interface device includes: one or more integrated circuits (ICs), a first timer implemented on the one or more ICs, and a second timer implemented on the one or more ICs. The first timer is used by the network interface device to estimate a start time of a range measurement signal exchange session between the first communication device and a second communication device, and the second timer is used by the network interface device to determine at least times of departure of range measurement packets associated with the range measurement signal exchange session at the first communication device. The one or more ICs are configured to: generate a first range measurement packet for the range measurement signal exchange session between the first communication device and the second communication device; record a time value of the first timer corresponding to a time of transmission of the range measurement packet; transmit the first range measurement packet; generate a second range measurement packet for the range measurement signal exchange session between the first communication device and the second communication device; include timing information corresponding to the recorded time value of the first timer in the second range measurement packet; and transmit the second range measurement packet associated with the range measurement signal exchange session, wherein the timing information in the second range measurement packet is useable by a third communication device to adjust a third timer, wherein the third communication device includes the third timer, and wherein the third timer is used by the third communication device to estimate a start time of a next range measurement signal exchange session between the first communication device and the second communication device.

In other embodiments, the apparatus further comprises one of, or both of, the following features.

A time interval between the first range measurement packet and the second range measurement packet is useable by the third communication device to adjust the third timer of the third communication device.

The timing information includes the recorded time value of the first timer.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method comprising:
generating, at a first communication device, a packet associated with a range measurement signal exchange session between the first communication device and a second communication device;
determining, at the first communication device, a time value of a first timer corresponding to a time of transmission of the packet;
including, at the first communication device, timing information corresponding to the determined time value in the packet; and
transmitting, from the first communication device, the packet to the second communication device, wherein the timing information in the packet is useable by a third communication device, after the third communication device obtains the timing information from the packet, to adjust time values corresponding to a second timer, wherein the third communication device includes the second timer, and wherein the second timer is useable by the third communication device to estimate a start time of a next range measurement signal exchange session between the first communication device and the second communication device.

2. The method of claim 1, wherein the determined time value of the first timer is a time corresponding to when the transmission of the packet is initiated at the second communication device.

3. The method of claim 1, wherein the determined time value of the first timer is a time corresponding to when the packet is transmitted from the second communication device.

4. The method of claim 1, wherein:
the first timer is used at the first communication device to determine a start time of the range measurement signal exchange session, and
the second timer is used at the second communication device to determine the start time of the range measurement signal exchange session.

5. The method of claim 1, wherein the timing information includes the determined time value of the first timer at the first communication device.

6. The method of claim 1, wherein the timing information includes a difference between a first set of bits corresponding to the determined time value of the first timer and a time value of a third timer at the first communication device.

7. The method of claim 6, wherein the timing information further includes a second set of bits corresponding to the determined time value of the first timer at the first communication device, wherein the second set of bits does not include any of the first set of bits.

8. The method of claim 1, wherein the packet is a range measurement packet.

9. The method of claim 1, wherein the packet includes one of a probe response frame or a traffic indication map (TIM) frame.

10. An apparatus, comprising:
a network interface device associated with a first communication device, wherein the network interface device includes one or more integrated circuits (ICs) configured to:
generate a packet associated with a range measurement signal exchange session between the first communication device and a second communication device;
determine a time value of a first timer corresponding to a time of transmission of the packet;
include, in the packet, timing information corresponding to the determined time value; and
transmit the packet to the second communication device, wherein the timing information in the packet is useable by a third communication device, after the third communication device obtains the timing information from the packet, to adjust time values corresponding to a second timer, wherein the third communication device includes the second timer, and wherein the second timer is useable by the third communication device to estimate a start time of a next ramie measurement signal exchange session between the first communication device and the second communication device.

11. The apparatus of claim 10, wherein the determined time value of the first timer is a time corresponding to when the transmission of the packet is initiated at the second communication device.

12. The apparatus of claim 10, wherein the determined time value of the first timer is a time corresponding to when the packet is transmitted from the second communication device.

13. The apparatus of claim 10, wherein:
the first timer is used at the first communication device to determine a start time of the range measurement signal exchange session, and
the second timer is used at the second communication device to determine the start time of the range measurement signal exchange session.

14. The apparatus of claim 10, wherein the timing information includes the determined time value of the first timer at the first communication device.

15. The apparatus of claim 10, wherein the timing information includes a difference between a first set of bits corresponding to the determined time value of the first timer and a time value of a third timer at the first communication device.

16. The apparatus of claim 15, wherein the timing information further includes a second set of bits corresponding to the determined time value of the first timer at the first communication device, wherein the second set of bits does not include any of the first set of bits.

17. The apparatus of claim 10, wherein the packet is a range measurement packet.

18. The apparatus of claim 10, wherein the packet includes one of a probe response frame or a traffic indication map (TIM) frame.

19. A method at a first communication device that includes a first timer and a second timer, wherein the first timer is used by the first communication device to estimate a start time of a range measurement signal exchange session between the first communication device and a second communication device and wherein the second timer is used by the first communication device to determine at least times of departure of packets associated with the range measurement signal exchange session at the first communication device, the method comprising:

generating, at the first communication device, a first packet associated with the range measurement signal exchange session between the first communication device and the second communication device;

recording, at the first communication device, a time value of the first timer corresponding to a time of transmission of the first packet and a time value of the second timer corresponding to the time of transmission of the first packet;

transmitting, from the first communication device, the first packet;

generating, at the first communication device, a second packet associated with the range measurement signal exchange session between the first communication device and the second communication device;

including, at the first communication device, timing information corresponding to the recorded time value of the first timer and the recorded time value of the second timer in the second packet; and transmitting, from the first communication device, the second packet associated with the range measurement signal exchange session, wherein the timing information corresponding to the recorded time value of the first timer in the second packet is useable by a third communication device to adjust a third timer, wherein the third communication device includes the third timer, and wherein the third timer is useable by the third communication device to estimate a start time of a next range measurement signal exchange session between the first communication device and the second communication device.

20. The method of claim 19, wherein a time interval between the first packet and the second packet is useable by the third communication device to adjust the third timer of the third communication device.

21. The method of claim 19, wherein the timing information includes the recorded time value of the first timer.

22. The method of claim 19, wherein the first packet is a range measurement packet.

23. The method of claim 19, wherein the first packet includes one of a probe response frame or a traffic indication map (TIM) frame.

24. An apparatus, comprising:
a network interface device associated with a first communication device, wherein the network interface device includes one or more integrated circuits (ICs), wherein the network interface device includes a first timer implemented on the one or more ICs and a second timer implemented on the one or more ICs, wherein the first timer is used by the network interface device to estimate a start time of a range measurement signal exchange session between the first communication device and a second communication device, and wherein the second timer is used by the network interface device to determine at least times of departure of packets associated with the range measurement signal exchange session at the first communication device;

wherein the one or more ICs are configured to:
generate a first packet associated with the range measurement signal exchange session between the first communication device and the second communication device;

record a time value of the first timer corresponding to a time of transmission of the first packet and a time value of the second timer corresponding to the time of transmission of the first packet;

transmit the first packet;

generate a second packet associated with the range measurement signal exchange session between the first communication device and the second communication device;

include timing information corresponding to the recorded time value of the first timer and the time value of the second timer in the second packet; and transmit the second packet associated with the range measurement signal exchange session, wherein the timing information corresponding to the recorded time value of the first timer in the second packet is useable by a third communication device to adjust a third timer, wherein the third communication device includes the third timer, and wherein the third timer is useable by the third communication device to estimate a start time of a next range measurement signal exchange session between the first communication device and the second communication device.

25. The apparatus of claim 24, wherein a time interval between the first packet and the second packet is useable by the third communication device to adjust the third timer of the third communication device.

26. The apparatus of claim 24, wherein the timing information includes the recorded time value of the first timer.

* * * * *